UNITED STATES PATENT OFFICE.

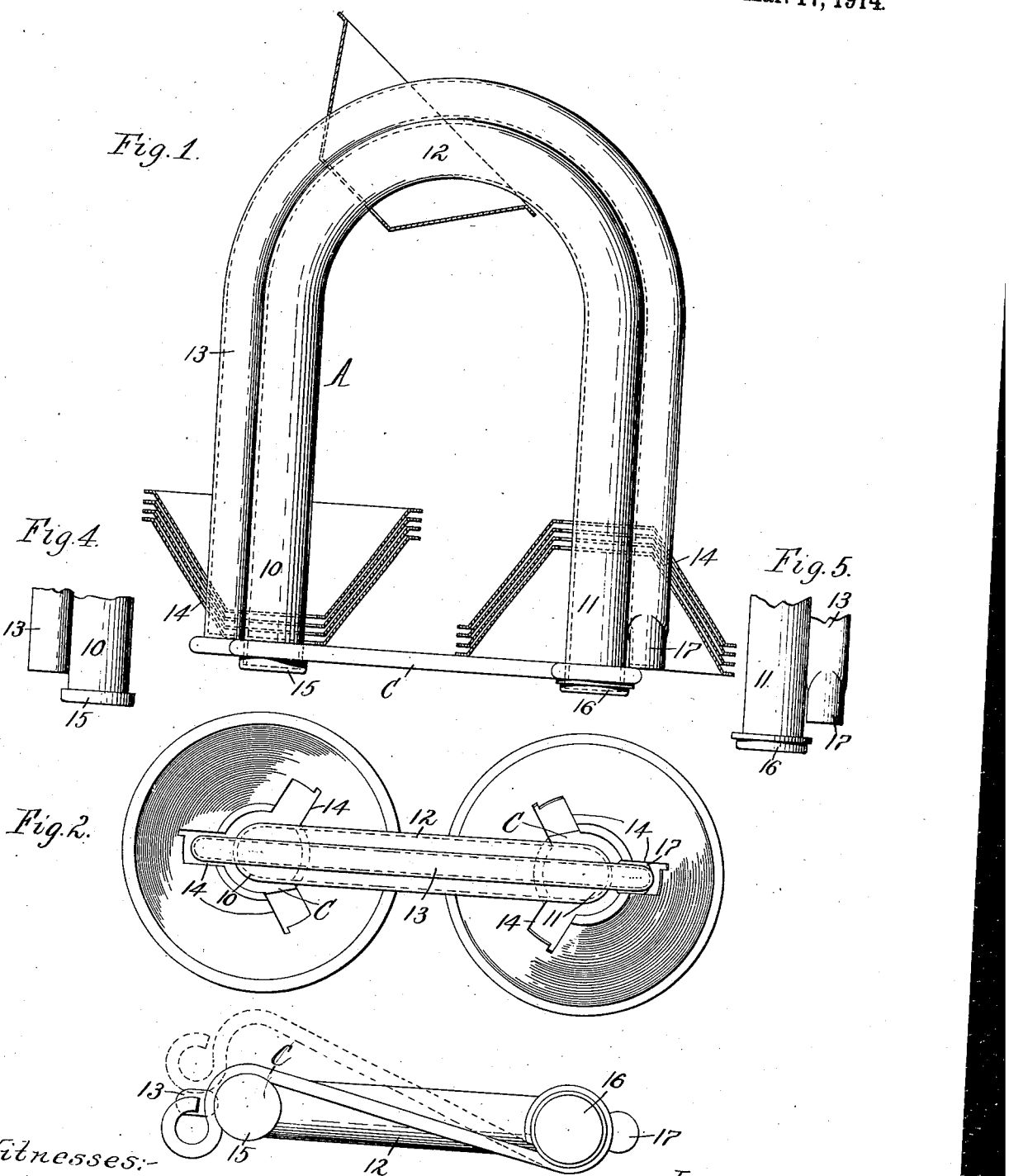

HERBERT McCORNACK, OF WEST CHESTER, PENNSYLVANIA.

DEVICE FOR CLEANING SEPARATOR-DISKS.

1,090,554.  Specification of Letters Patent.  Patented Mar. 17, 1914.

Application filed November 27, 1911. Serial No. 662,584.

*To all whom it may concern:*

Be it known that I, HERBERT McCORNACK, a citizen of the United States, residing at West Chester, in the county of Chester and State of Pennsylvania, have invented a new and useful Improvements in Devices for Cleaning Separator-Disks, of which the following is a specification.

This invention relates to a device for holding the disks of centrifugal cream separators while the same are being washed.

In the use of separators provided with liners consisting of a number of superposed separable tin disks or cones, it is customary and necessary to remove the disks from the bowl of the separator after the separating operation has been finished and to thoroughly cleanse the disks. This is a matter of some difficulty because the disks are closely nested and each disk is required to be thoroughly cleaned on both sides in order to keep the disks in a wholesome and sanitary condition.

The object of this invention is to produce a holder for disks of this kind on which the disks can be readily placed after they have been removed from the separating bowl, on which the disks are conveniently held while being brushed or washed, and which permits each disk to be separated from the others and to be inverted so that it can be thoroughly brushed or cleaned on both sides.

In the accompanying drawings: Figure 1 is an elevation of this improved disk holder. Fig. 2 is a top plan view of the same. Fig. 3 is a bottom plan view of the same. Fig. 4 is a fragmentary elevation of the end portion of the free branch of the holder. Fig. 5 is a similar view of the end portion of the other branch.

Like reference characters refer to like parts in the several figures.

The holder A is of U shape and comprises two approximately parallel holding branches 10 11 and a curved top or connecting portion 12 which is so shaped as to permit the disks B to be transferred from one holding branch to the other. The holder is provided at its open end with a hinged latch C or other suitable retaining device which when released permits the disks to be placed upon the free branch of the holder and when closed confines the disks on the holder. As shown, the latch is pivoted to the branch 11 of the holder and releasably connected with the branch 10.

The holder is preferably provided with a rib or flange 13 which enters one of the notches 14 of each disk and prevents the disks from turning on the holder while being brushed or washed. In the style of disks shown in the drawings each disk is provided with three notches 14 for engagement with projections on the central tube of the separating bowl and the rib on the holder is arranged to engage in one of these notches. When the arrangement or formation of the notch is of a different style from that shown, the arrangement of the rib on the holder will be modified accordingly.

The body portion of the holder is preferably formed of seamless tubing which is bent to the desired shape and the rib on the holder is formed of similar tubing, flattened in a press and soldered or brazed to the body portion. The end of the branch 10 of the body portion is closed by a cap 15 and the end of the branch 11 by a cap 16. The end portion 17 of the rib 13 on the branch 11 is preferably left round or is otherwise enlarged, if necessary, to prevent the disks from slipping down. While the construction of the holder from tubing is preferred, other ways of constructing the holder may be resorted to, if desired.

In using the holder the set or nest of disks to be cleaned is placed upon a table or other support, the free branch 10 of the holder is then inserted into the nest of disks, the latch having first been released from the end of the branch 10, the disks are then pushed up on the branch 10 and the latch is secured to said arm to prevent the escape of the disks from the holder. The holder with the disks attached thereto is now placed in a basin containing hot water or some other cleansing liquid and the disks are brushed or cleaned one after another, first on one branch of the holder, where the disks are cleaned on one side, and then on the other branch where the disks are cleaned on the opposite side. Each disk is inverted as it is passed from one branch to the other over the connecting top portion 12 of the holder. When the disks have been cleaned they are removed from the holder upon releasing the latch.

I claim as my invention:

1. A U-shaped holder for separator disks comprising two branches spaced apart and adapted each to be engaged in the central openings of the disks for holding the disks during the cleaning operation, releasable holding means permitting the disks to be applied to and removed from one of said branches, and means for supporting the disks in an inverted position on the other branch.

2. A U-shaped holder for separator disks comprising two branches spaced apart and adapted each to be engaged in the central openings of the disks for holding the disks during the cleaning operation, releasable holding means attached to one of said arms and supporting the disks thereon in an inverted position, said holding means being adapted to be releasably engaged with the other branch for permitting the disks to be applied to said branch, to support the disks thereon during the cleaning operation and to permit the disks to be removed.

3. A U-shaped holder for separator disks comprising two branches spaced apart and adapted each to be engaged in the central openings of the disks for holding the disks during the cleaning operation, and a retaining device pivotally attached to one of said branches and adapted to be engaged with or disengaged from the other branch.

4. A holder for separator disks comprising two branches spaced apart to hold each a series of disks separately, and a curved portion which connects said branches and enables the disks to be moved along the holder from one branch to the other, said holder being adapted to pass through the central openings of the disks and being provided on its outer side with a longitudinal registering rib which engages in notches in the disks, substantially as set forth.

Witness my hand in the presence of two subscribing witnesses.

HERBERT McCORNACK.

Witnesses:
 ROBERT WARNOCK,
 BESSIE HOGELAND.